(12) United States Patent
Jochumsen et al.

(10) Patent No.: US 8,646,475 B2
(45) Date of Patent: Feb. 11, 2014

(54) DOSING PUMP UNIT

(75) Inventors: Hans Henrik Jochumsen, Allerod (DK); Niels Stubager Kiemer, Sjaelland (DK); Karim Lindberg, Vekso (DK); Niels Torp Madsen, Birkerod (DK); Tom Johansen, Helsingborg (SE)

(73) Assignee: Grundfos Nonox a/s, Bjerringbro (DK)

( * ) Notice: Subject to any disclaimer, the term of this patent is extended or adjusted under 35 U.S.C. 154(b) by 857 days.

(21) Appl. No.: 11/813,171

(22) PCT Filed: Dec. 29, 2005

(86) PCT No.: PCT/EP2005/014111
§ 371 (c)(1),
(2), (4) Date: Nov. 1, 2007

(87) PCT Pub. No.: WO2006/072443
PCT Pub. Date: Jul. 13, 2006

(65) Prior Publication Data
US 2008/0138215 A1    Jun. 12, 2008

(30) Foreign Application Priority Data

Dec. 30, 2004   (EP) .................................. 04 030 996

(51) Int. Cl.
*G05D 11/02*   (2006.01)

(52) U.S. Cl.
USPC ........... 137/98; 137/114; 137/565.11; 60/286

(58) Field of Classification Search
USPC .............. 137/98, 99, 115.01, 115.13, 115.14, 137/115.25, 563, 88, 114, 565.11, 565.16; 60/274, 289, 286
See application file for complete search history.

(56) References Cited

U.S. PATENT DOCUMENTS

| 1,212,806 A | 1/1917 | Newton |
| 1,921,895 A | 8/1933 | Taurisano |

(Continued)

FOREIGN PATENT DOCUMENTS

| DE | 199 46 902 A1 | 4/2001 |
| DE | 19946902 A1 | 4/2001 |

(Continued)

OTHER PUBLICATIONS

DE19946902 Translation—an automated translation of Bosch (DE19946902) provided by the EPO.*

(Continued)

*Primary Examiner* — Craig Schneider
*Assistant Examiner* — Kevin Murphy
(74) *Attorney, Agent, or Firm* — Panitch Schwarze Belisario & Nadel LLP (57) ABSTRACT

The invention relates to a dosing pump unit for mixing a liquid reducing agent with an exhaust gas flow by means of a dosing pump which is connected, on the input side thereof, to a connection connectable to a reducing agent tank and, on the output side thereof, to a pressure pipe and a pipe for returning flow back to said reducing agent tank, wherein a non-return valve which is prestressed against a hydraulic pressure produced by the dosing pump is arranged in the pressure line, the return pipe is connected to the pressure pipe upstream of the non-return valve in the reducing agent flow direction and a first stop valve for selectively closing the return pipe is placed therein.

11 Claims, 7 Drawing Sheets

(56) References Cited

U.S. PATENT DOCUMENTS

| | | | |
|---|---|---|---|
| 2,655,178 A | 10/1953 | Sarosdy | |
| 3,693,656 A | 9/1972 | Sauer | |
| 4,938,254 A | 7/1990 | Gimby | |
| 5,645,804 A * | 7/1997 | Sumiya et al. | 423/239.1 |
| 5,884,475 A | 3/1999 | Hofmann et al. | |
| 6,050,088 A * | 4/2000 | Brenner | 60/303 |
| 6,187,182 B1 | 2/2001 | Reynolds et al. | |
| 6,192,677 B1 * | 2/2001 | Tost | 60/286 |
| 6,220,296 B1 * | 4/2001 | Ragsdale et al. | 137/625.47 |
| 6,273,120 B1 | 8/2001 | Hoffman et al. | |
| 6,470,673 B1 * | 10/2002 | van Nieuwstadt et al. | 60/274 |
| 6,814,303 B2 | 11/2004 | Edgar et al. | |
| 6,848,251 B2 | 2/2005 | Ripper et al. | |
| 7,017,335 B2 * | 3/2006 | Huber et al. | 60/286 |
| 7,100,366 B2 | 9/2006 | Hager et al. | |
| 7,467,749 B2 | 12/2008 | Tarabulski et al. | |
| 7,481,049 B2 | 1/2009 | Huber et al. | |
| 2003/0033799 A1 | 2/2003 | Scheying | |
| 2003/0188783 A1 | 10/2003 | Vicars | |
| 2004/0047783 A1 * | 3/2004 | Huber et al. | 423/235 |
| 2004/0060286 A1 * | 4/2004 | Huber et al. | 60/286 |
| 2004/0083723 A1 * | 5/2004 | Hager et al. | 60/286 |
| 2004/0115074 A1 | 6/2004 | Huber et al. | |
| 2004/0177606 A1 * | 9/2004 | Scharsack | 60/286 |

FOREIGN PATENT DOCUMENTS

| | | |
|---|---|---|
| DE | 19947197 A1 | 4/2001 |
| DE | 10116214 A1 | 7/2007 |
| EP | 1435458 A1 | 7/2007 |
| KR | 10-2002-0033828 A | 5/2002 |
| KR | 10-2002-0034199 A | 5/2002 |
| KR | 10-2004-0030650 A | 4/2004 |
| WO | 9011010 A1 | 10/1990 |
| WO | 00/79108 A1 | 12/2000 |
| WO | 01/23715 A1 | 4/2001 |
| WO | 01/25600 A1 | 4/2001 |
| WO | 02/25074 A1 | 3/2002 |
| WO | 0227160 A1 | 4/2002 |
| WO | 02/101209 A1 | 12/2002 |

OTHER PUBLICATIONS

Jochumsen et al.; U.S. Appl. No. 11/813,172, filed Jun. 29, 2007; Dosing Pump Unit.
Jochumsen et al.; U.S. Appl. No. 11/813,233, filed Jul. 2, 2007; Metering Pump Assembly.
International Search Report dated Mar. 29, 2006 in International Application No. PCT/EP2005/014113.
International Search Report dated Mar. 14, 2006 in International Applicationn No. PCT/EP2005/014112.
US Office Action dated Nov. 9, 2009 in U.S. Appl. No. 11/813,233.
US Office Action dated Jun. 1, 2010 in U.S. Appl. No. 11/813,233.
US Office Action dated Sep. 24, 2009 in U.S. Appl. No. 11/813,172.
US Office Action dated Apr. 7, 2010 in U.S. Appl. No. 11/813,172.
Int'l Search Report dated Apr. 3, 2006 in Int'l Appln No. PCT/EP2005/014111.
Office Action Issued Dec. 23, 2010 in U.S. Appl. No. 11/813,233.
Office Action issued Dec. 6, 2012 in U.S. Appl. No. 11/813,172.

* cited by examiner

DOSING PUMP UNIT

CROSS-REFERENCE TO RELATED APPLICATIONS

This application is a Section 371 of International Application No. PCT/EP2005/014111, filed Dec. 29, 2005, which was published in the German language on Jul. 13, 2006, under International Publication No. WO 2006/072443 A1, the disclosure of which is incorporated herein by reference.

BACKGROUND OF THE INVENTION

The invention relates to a metering pump assembly for admixing a fluid reduction agent into an exhaust gas flow With self-ignition internal combustion engines, nitrogen oxides arise on operation with excess oxygen, which is the case in the majority of operating conditions, and specifically in particular with direct injection into the main combustion space, as is typically the case with diesel motors. In order to reduce these nitrogen oxide emissions, it is known to lead the exhaust gas flow to a reduction catalyser. Thereby, as a reduction agent, usually an aqueous urea solution is led in a finely distributed manner to the exhaust gas before entry into the catalyser. Thereby, the supplied quantity of urea is to be matched as precisely as possible to the combustion process, in order on the one hand to ensure an as complete as possible reduction within the catalyser, and on the other hand to prevent an excess of urea.

A special metering pump assembly for metering and feeding reduction agent to the exhaust gas flow is known from EP 1 435 458 A1. With this metering pump assembly, the supplied reduction agent, before feeding to the exhaust gas flow, is mixed or impinged with pressurized air in the metering pump assembly. In order to be able to firstly bleed the system on starting operation, a 3/2-way valve as a preflushing valve is arranged in front of a premixing device, in which the mixing of the reduction agent with pressurized air is effected. On starting operation of the assembly, this preflushing valve is firstly switched such that the metering pump conveys the aspirated reduction agent back into the reduction agent tank, until the conduits are completely filled with reduction agent. The premixing valve is then switched over, so that the reduction agent is supplied to the premixing device.

The object of the present invention is to simplify the construction of the metering pump assembly known from EP 1 435 458 A1.

This object is achieved by a metering pump assembly with the features specified in claim 1. Preferred embodiments are to be deduced from the dependent claims.

BRIEF SUMMARY OF THE INVENTION

According to the invention, the desired simplification of the construction of the metering pump assembly results on account of the following construction. The metering pump assembly for admixing a fluid reduction agent into an exhaust gas flow comprises a metering pump which on the entry side is connected to a connection for connecting to a reduction agent tank, and at the exit side is connected to a pressure conduit as well as a return conduit to the reduction agent tank. Connections may be provided on the metering pump assembly, for the suction conduit as well as the return conduit to the reduction agent tank, to which conduits or flexible tubing which lead to the reduction agent tank are connected. The pressure conduit which extends behind the metering pump in the flow direction, is part of the metering pump assembly, and for example leads to a premixing device in which the delivered reduction agent is impinged with pressurized gas. The return conduit branches away from the pressure conduit and is in connection with this. According to the invention, a return valve which is biased against the fluid pressure produced by the metering pump, is arranged in the pressure conduit. This means that the biasing retains the return valve closed against the fluid pressure produced by the metering pump, as long as the fluid pressure does not exceed a certain pressure value, at which the force acting on the return valve on account of the fluid pressure corresponds to the biasing force of the return valve. If the fluid pressure exceeds this limit value, the return valve is opened against its biasing by way of the delivered reduction agent. The return conduit is connected to the pressure conduit in front of the return valve in the flow direction of the reduction agent. Furthermore, a first shut-off valve for the selective closure of the return conduit is arranged in the return conduit. One may make do without a complicated 3/2-way valve for bleeding and filling the system by way of this arrangement, and instead of this, provide a simple switching- or shut-off valve in the return conduit.

On starting operation of the metering pump assembly, the metering pump, for example a membrane pump, firstly delivers reduction agent out of the reduction agent tank and pumps this through the return conduit back into the tank, until the metering pump and the pressure conduit are completely filled with reduction agent. Since the provided return valve is biased, as long as the fluid pressure of the reduction agent does not reach the pressure value for opening the return valve, one may ensure that the reduction agent does not flow further for example to a premixing device and in particular into the exhaust gas system of the combustion motor, but firstly through the opened shut-off valve and the return conduit back into the reduction agent tank. After the complete filling of the system with reduction agent, the return conduit may be closed by the shut-off valve, so that the reduction agent may no longer flow back into the reduction agent tank. If then the fluid pressure in the pressure conduit is increased, the return valve opens, and the reduction agent may, as the case may be, via a premixing device, be delivered into the exhaust gas system of the combustion engine.

In order to ensure the opening of the return valve at the correct point in time, the biasing force which keeps the return valve closed, is preferably larger than the force acting on the return valve on account of the fluid pressure with an opened return conduit. By way of this, it is ensured that no reduction agent may flow through the return valve during the preflushing or filling. Further preferably, the biasing force is selected such that with a closed return conduit, i.e. when the shut-off valve blocks the return conduit, the force acting on the return valve due to the fluid pressure exceeds the biasing force of the return valve, so that this is opened and the reduction agent may flow through the return valve. If after closure of the return conduit, the metering pump continues to deliver reduction agent, the pressure in the pressure conduit automatically increases downstream behind the metering pump, so that when the biasing force of the return valve is selected in a suitable manner, this is automatically opened. Since reduction agent may flow away out of the pressure conduit with an opened return conduit, a reduction of the pressure in the pressure conduit automatically occurs, so that the return valve is automatically closed in this condition with a suitably selected biasing force. The return valve may for example be biased by a compression spring, for example a helical spring, whose spring force is matched to the fluid pressure occurring in the pressure conduit, such that the automatic closure and opening of the return valve, as previously described, is ensured.

It is further preferable to arrange the return valve directly on a mixing chamber of a premixing device, in which the reduction agent delivered by the metering pump is impinged or mixed with a pressurized gas. With this arrangement, the return valve may assume a double function. On the one hand the return valve, as previously described, on bleeding or preflusing the metering pump, ensures that the reduction agent firstly does not yet flow further into the premixing device and the exhaust gas system of the combustion engine. On the other hand, the return valve directly on the premixing device ensures that no pressurized gas, in particular pressurized air, with the reduction agent, may flow back into the pressure conduit. A return flow of reduction agent, and in particular a reduction agent/pressurized gas mixture is undesirable, since for example urea tends to crystallize in contact with air. For this reason, the return valve is preferably arranged directly on the mixing region, in which the pressurized gas is mixed with the reduction agent, so that the region located downstream of the return valve may be freed from reduction agent residues by way of the pressurized gas, and the conduit region located upstream of the return valve is securely kept held free of reduction agent and pressurized gas flowing back. The construction of the whole metering pump assembly may be considerably simplified, and simultaneously a large operational reliability is ensured, by way of this double function of the return valve.

It is further preferable to arrange a pressure sensor detecting the fluid pressure, in the pressure conduit or return conduit, in front of the return valve and the shut-off valve in the flow direction. Various operating conditions of the metering pump assembly, and in particular possible faults on operation of the metering pump assembly, may be detected via this pressure sensor. Firstly, on preflusing on starting operation of the metering pump assembly, the pressure sensor may be used to determine when the pressure conduit is completely filled with reduction agent, and thus when the metering pump assembly is ready for operation. When the pressure sensor detects the pressure threshold value indicating this operation condition, the shut-off valve in the return conduit may then be closed, so that the metering pump then delivers the reduction agent via the return valve, as the case may be, via a premixing device, into the exhaust gas flow. Furthermore, the pressure sensor may be used to detect a blockage of the pressure conduit situated further downstream, and in particular of the injection nozzle in the exhaust gas flow. Then specifically the pressure in the pressure conduit increases above a pressure value occurring on normal operation, which is detected by the pressure sensor. A corresponding warning notice may be outputted e.g. by a control device, and the metering pump assembly may be switched off as the case may be. Furthermore, by way of the pressure sensor, one may also determine when the reduction agent supply in the reduction agent tank has been consumed. Specifically, the pressure in the pressure conduit on operation then sinks to below a pressure value occurring during normal operation. If accordingly, the pressure sensor detects a lower pressure limit value, then the lacking reduction agent supply may be detected and be suitably displayed e.g. via a control device. In this condition too, the metering pump assembly may be firstly automatically switched off, until the filling of the reduction agent by way of a control device, in order to avoid damage on operation without reduction agent.

In order to ensure the starting operation of the metering pump assembly after the preflusing or bleeding, the first shut-off valve is advantageously coupled to the pressure sensor in a manner such that the first shut-off valve is switched over into its position closing the return conduit on reaching a predefined fluid pressure detected by the pressure sensor. The predefined limit value for the fluid pressure at which the return conduit is closed, is selected such that the complete filling of the pressure conduit with reduction agent on starting operation of the metering pump assembly may always be ensured. This means that the metering pump is firstly bled, before the metering pump assembly is started in operation, and reduction agent is injected into the exhaust gas flow. This is particularly important when the metering pump assembly is started in operation for the first time after filling the reduction agent tank.

The first shut-off valve is preferably biased in a manner such that in the idle position, it is held in its position opening the return conduit. In this manner, it is ensured that the return conduit is open to the reduction agent tank when the metering pump assembly is not in operation, so that the entire system and in particular the pressure conduit are not under pressure. In this manner, one may ensure that the biased return valve securely keeps the pressure conduit closed in the switched-off condition of the metering pump assembly, so that reduction agent may not inadvertently exit from the metering pump assembly. The biasing may be effected for example by way of spring force. An actuation force which is larger than the biasing force must be mustered for the closure of the first shut-off valve.

It is particularly preferable to provide a premixing device, in which the reduction agent delivered by the metering pump is impinged or mixed with a pressurized gas, and to arrange a second shut-off valve for the selective interruption of the pressurized gas supply, at the entry side in a pressurized gas conduit leading to the premixing device. The pressurized gas supply may for example be effected from a central pressurized air supply of a motor vehicle, in particular lorry. The second shut-off valve then serves for being able to switch the pressurized gas or pressurized air supply into the metering pump assembly on and off in a targeted manner. On starting operation of the metering pump assembly, the second shut-off valve is opened in order to let pressurized gas flow into the metering pump assembly, and to mix the delivered reduction agent with pressurized gas in the premixing device. Thereby, a fine mixing between the reduction agent and the pressurized gas does not need to be effected in the premixing device, but rather it is sufficient to impinge the reduction agent only with pressurized gas, so that larger reduction agent droplets are conveyed further to an injection nozzle into the exhaust gas flow by way of the pressurized gas. A finer atomization of the reduction agent in the exhaust gas flow is effected on exit from the injection nozzle.

It is particularly preferable for the first shut-off valve in the return conduit to be coupled to the second shut-off valve in the pressurized gas conduit, in a manner such that the return conduit is closed when the pressurized gas conduit is open. This permits a very simple and secure starting operation of the metering pump assembly, since both shut-off valves do not need to be switched independently of one another. On account of the coupling, it is indeed possible to actuate only one of the valves, for example the second shut-off valve, and simultaneously to automatically also switch over the other one, for example the first shut-off valve. Thus for example it is possible, by way of opening the second shut-off valve, to firstly switch on the pressurized gas supply to the metering pump assembly, wherein then the return conduit is automatically closed by way of the coupling, so that the reduction agent delivered by the metering pump amid the opening of the return valve, is then also conveyed into the premixing device, where it is mixed with the pressurized gas. Conversely, on account of the coupling on switching off the metering pump assembly, it is ensured that when the pressurized gas supply is interrupted by the closure of the second shut-off valve, the first shut-off valve in the return conduit is also automatically opened, so that the reduction agent which is delivered further by the metering pump may flow back into the reduction agent tank, or the pressure conduit is switched in a pressureless manner. In this manner, it is ensured that no reduction agent gets into the premixing device and further downstream to the injection nozzle into the exhaust gas flow, if no pressurized gas flows into the metering pump assembly. An undesirable blocking or clogging of the conduits downstream of the return valve in the pressure conduit is thus prevented.

The first shut-off valve is particularly preferably actuatable by pressurized gas for coupling the two shut-off valves, wherein the pressurized gas conduit leading to the premixing device is connected to an actuation connection of the first shut-off valve, e.g. via an actuation conduit, behind the second shut-off valve in the flow direction. This permits a purely pneumatic coupling between the two shut-off valves, so that the number of the electrically actuated components in the metering pump assembly may be reduced, which leads to a further simplified construction. The arrangement permits the first shut-off valve to be closed by way of the pressure of the pressurized gas led to the premixing device, preferably against a spring bias. Thus no additional actuation elements whatsoever are required for the closure of the first shut-off valve.

The actuation connection of the first shut-off valve is preferably connected to the pressurized gas conduit leading to the premixing device, in a region which in the flow direction lies on front of a throttle location in the pressurized gas conduit. In this manner, an adequately high gas pressure at the actuation connection of the first shut-off valve is ensured for its actuation, whilst the premixing device is supplied with a lower gas- or air pressure via the throttle location.

It is further preferable for the second shut-off valve to be coupled to a pressure sensor arranged in the flow direction in front of the return valve and the first shut-off valve, in the pressure conduit or the return conduit, in a manner such that the second shut-off valve is switched over into its position opening the pressurized air conduit on reaching a defined fluid pressure detected by the pressure sensor. This means that on starting operation of the metering pump assembly, one may firstly switch on the metering pump, wherein the pressurized gas supply is firstly still closed by the second shut-off valve. Firstly, a preflushing or bleeding of the metering pump is effected via the return conduit which is still open. If then it is ascertained by way of the pressure sensor, that a certain pressure value has been reached in the pressure conduit, which indicates that the pressure conduit is completely filled with reduction agent, the second shut-off valve is then opened, so that the pressurized gas may flow into the metering pump assembly and to the premixing device. If then, as described previously, the first shut-off valve is also coupled to the second shut-off valve, then simultaneously the return to the reduction agent tank may be closed, so that the reduction agent is delivered into the premixing device via the return valve which then opens. The coupling of the pressure sensor and the first shut-off valve may be realized electronically via a control device but also mechanically, pneumatically or hydraulically.

The second shut-off valve in the pressurized gas conduit is particularly preferably biased in a manner such that in the idle position, it is held in its position interrupting the pressurized gas conduit. In this manner, on switching off the metering pump assembly, it is always ensured that the pressurized gas supply to the metering pump assembly is interrupted. The second shut-off valve may for example be biased by way of spring force, so that it must be opened by an actuation force to be mustered externally. Thereby, the actuation force is preferably produced electrically e.g. electromagnetically. If then the current supply, e.g. the flow of current in a coil in the electromagnet, is switched off, the actuation force stops and the bias automatically closes the shut-off valve.

Furthermore, a further return valve may be arranged in the premixing device on the exit side of the pressurized gas supply, and this further return valve prevents reduction agent from being able to flow from the premixing device back into the pressurized gas conduit on switching off the pressurized gas supply to the premixing device. It may thus be ensured that the pressurized gas conduit is kept free from contamination. This second return valve is preferably likewise biased, so that it opens at a certain pressure in the pressurized gas conduit, and automatically closes on falling short of this pressure value or on switching off the pressurized gas supply, for example by way of closure of the second shut-off valve.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
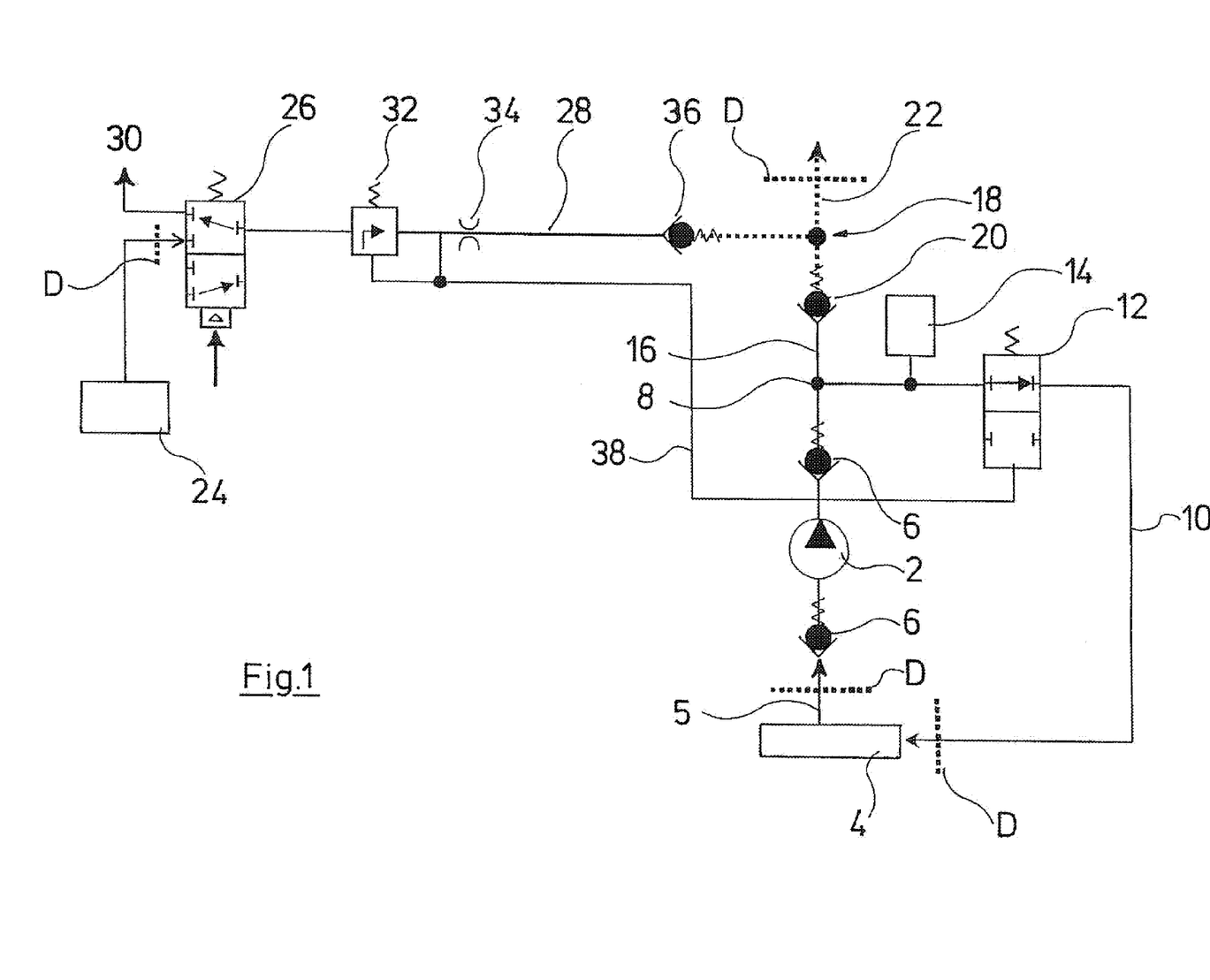
FIG. 1 is a circuit diagram of the hydraulic components of a metering pump assembly according to the invention.

The basic function of one embodiment example of a metering pump assembly according to the invention is firstly described by way of the circuit diagram in FIG. 1.

The core piece of the metering pump assembly is a metering pump 2 which is designed as a membrane pump, with an associated drive. By way of the control of the drive, and in particular the control of the number of pump strokes and/or the stroke speed, one may set the quantity of the reduction agent delivered by the metering pump 2, in order to be able to adapt the reduction agent quantity exactly to the requirements with regard to the currently occurring combustion process in the motor. An aqueous urea solution is preferably applied as a reduction agent. The reduction agent is kept ready in a reduction agent tank 4 from which it is suctioned by the metering pump 2 via a suction conduit 5. In the shown example, in each case a return valve 6 which is an essential constituent of the membrane pump, is arranged in the known manner in front of and behind the metering pump 2. Thus the return valve 6 which in the flow direction is situated in front of the pump, ensures that the reduction agent is not delivered back into the reduction agent tank 4 with a pump stroke. The return valve 6 lying behind the metering pump 2 in the flow direction conversely ensures that on suctioning, reduction agent is suctioned only from the reduction agent tank 4, and not suctioned back out of the pressure conduit.

A return conduit 10 which leads back to the reduction agent tank 4 and serves for bleeding the system on starting operation of the metering pump 2, branches behind the metering pump 2 and the second return valve 6 at a branching point 8.

An interruption- or shut-off valve 12, by way of which the return conduit 10 may be closed, so that no reduction agent may flow back through the return conduit 10 to the reduction agent tank 4, is arranged in the return conduit 10. In the shown idle condition, the shut-off valve 12 is situated in the open position, in which the return conduit 10 is released. A pressure sensor 14 which detects the fluid pressure in front of the shut-off valve 12 and thus in the pressure conduit 16 behind the metering pump 2, is arranged in the return conduit 10 and in the flow direction in front of the shut-off valve 12 and behind the branching point 8.

The pressure conduit 16 leads from the metering pump 2 via the branching point 8 to the mixing region or the mixing chamber 18 of a device, in which the reduction agent is impinged or mixed with pressurized gas, in this case pressurized air. A return valve 20 is arranged directly in front of the mixing region 18 in the pressure conduit 16, i.e. at the end of the pressure conduit 16. This return valve is held in the shown idle position in a closed position by way of biasing, for example a spring, and a backflow of reduction agent and in particular of pressurized gas from the mixing region 18 into the pressure conduit 16 is prevented. A conduit 22 which leads to the injection nozzle in the exhaust gas system of the motor vehicle connects behind the mixing region 18 in the flow direction.

The pressurized air used as a pressurized gas in this shown example is made available by a pressurized air supply 24 of the motor vehicle. Such pressurized air supply systems are usually present in lorries, in particular for actuating the brakes. The shown metering pump assembly is connected to this central pressurized air supply 24, wherein the metering pump assembly on the entry side comprises a solenoid or magnetic valve 26 which selectively connects the pressurized air conduit 28 which leads to the mixing region 18, to the pressurized air supply 24 or to the atmosphere 30. The electrically actuated magnetic valve 26 is biased, such that in its idle position, it is kept in the shown position in which the pressurized air conduit 28 is opened to the atmosphere 30.

A pressure regulator 32 and behind this, a throttle 34 are arranged in the pressurized air conduit 28 behind the magnetic valve 26 in the flow direction.

The pressurized air conduit at the mixing chamber or the mixing region 18 ends in a return valve 36 which is biased such that it is closed in the shown idle position, and may be opened against its biasing by way of the pressure acting in the pressurized air conduit 28. It is thus ensured, that when no pressurized air flows out of the pressurized air conduit 28 into the mixing chamber 18, the return valve 36 is always closed, so that no reduction agent may penetrate from the mixing region 18 into the pressurized air conduit 28.

The shut-off valve 12 in the return conduit 10 is actuated by pressurized air and is connected to the pressurized air conduit 28 via an actuation conduit 38, wherein the actuation conduit 38 is in connection with the pressurized air conduit 28 between the pressure regulator 32 and the throttle 34. The actuation conduit 38 ensures that when the magnetic valve 26 is switched over so that the pressurized air conduit 28 is in connection with the pressurized air supply 24, the actuation conduit 38 is also subjected to pressure. The air pressure prevailing in the actuation conduit 38 then effects a switching-over of the shut-off valve 12 against its biasing, so that the return conduit 10 is closed.

The previously described elements which lie within the border indicated by the dashed line D in FIG. 1, i.e. in particular the metering pump 2, the shut-off valve 12, the magnetic valve 26, the mixing point 18, the return valves and the conduits connecting these components, are all integrated into the metering pump assembly, so that the metering pump assembly apart from electrical connections to the outside, only has four fluid connections, specifically for the connection to the pressurized air supply 24, for the connection of the conduit 22 leading to the injection nozzle, for the connection of the suction conduit 5 leading to the reduction agent tank 4, and for the connection of the return conduit 10 to the reduction agent tank 4.

On starting operation of the system, the magnetic valve 26 firstly remains in its closed idle position (shown position) in which the pressurized air conduit 28 is separated from the pressurized air supply 24. Firstly the metering pump 2 is set into operation, which via the suction conduit 5 suctions reduction agent out of the reduction agent tank 4. The biasing of the return valve 20 in the shown closed position is selected such that with the return conduit 10 opened, the pressure in the pressure conduit 16 is not sufficient to open the return valve against the biasing.

Since firstly no pressure is present in the pressurized air conduit 28, the actuation conduit 38 is at first also without pressure, so that the shut-off valve 12 remains in its opened idle position, and the return conduit 10 is opened. In this manner, the metering pump 2 firstly delivers reduction agent from the reduction agent tank 4 and via the branching point 8 through the return conduit 10 back into the reduction agent tank 4. This serves for bleeding the system on starting operation, i.e. firstly of ensuring that the pressure conduit 15 is completely filled with reduction agent.

If the pressure conduit 16 and the return conduit 10 are completely filled with reduction agent, the fluid pressure in the pressure conduit 16 and in the return conduit 10 in front of the shut-off valve 12 reaches a certain limit value, which is detected by the pressure sensor 14. When this limit value is detected by the pressure sensor 14, a control switches over the magnetic valve 26, so that the pressurized air conduit 28 is supplied with pressurized air via the pressurized air supply 24 of the lorry. The actuation conduit 38 is also impinged with pressure by way of this, by which means the shut-off valve 12 is switched over against the spring biasing, and the return conduit 10 is closed in this manner. Since now the pressure conduit 16 is no longer open to the reduction agent tank 4 via the return conduit 10, on further operation of the metering pump 2, the fluid pressure in the pressure conduit 16 increases to such an extent, that the pressure is sufficient to open the return valve 20 against its spring biasing, so that the reduction agent may flow into the mixing region 18 and is impinged there with pressurized air from the pressurized air conduit 28. The pressurized air and the reduction agent then together flow through the conduit 22 to an injection nozzle in the exhaust gas conduit of the lorry.

On operation, the quantity of the supplied reduction agent may be set by way of the number of pump strokes. The pressurized air flow through the pressurized air conduit 28 into the mixing region 18 is thereby constant.

If the installation is taken out of operation, in particular on switching off the vehicle, firstly the metering pump 2 is switched off, so that reduction agent may no longer be delivered from the reduction agent tank 4. The pressure in the pressure conduit 16, by way of this reduces to such an extent, that the return valve 20 closes on account of its biasing, and prevents further reduction agent from penetrating into the mixing region 18. Since the magnetic valve 26 at first continues to be open, pressurized air continues to flow through the return valve 36 into the mixing region 18, and flushes out the reduction agent residues which are still present, via the conduit 22.

If then the magnetic valve 26 is closed by way of switching off the current supply, the pressurized air flow through the pressurized air conduit 28 and the return valve 36 is also switched off, so that the whole system is taken out of operation. In this condition, the shut-off valve 12 again switches back into its idle position, i.e. the return conduit 10 is opened.

On account of the arrangement of the return valve 20, it is ensured that no air may penetrate from the mixing chamber or the mixing region 18 into the pressure conduit 16. Thus one may prevent a crystallization of the reduction agent in the pressure conduit 16. Since furthermore after switching off the metering pump 2, the mixing region 18 is automatically flushed out by the constant flow of pressurized air in this, one may also prevent a crystallization of reduction agent in the mixing region 18 and in the connecting conduit 22.

The pressure sensor 14 which preferably emits an electrical signal, apart from detecting the complete bleeding of the pressure conduit 16, also serves for the recognition of further undesired operating conditions. Thus one may recognize a blocked return conduit 10 by way of the pressure sensor 14, specifically when, with an opened shut-off valve, the pressure exceeds a predefined value which may not normally occur with an opened return conduit 10. The pressure sensor 14 may also detect that the injection nozzle in the exhaust gas conduit of the vehicle is blocked. Then, specifically the pressure in the pressure conduit 16 given an opened magnetic valve 26 likewise increases above a predefined limit value, which may not normally occur with a correctly functioning injection nozzle. Furthermore, one may also detect whether the reduction agent tank 4 is empty by way of the pressure sensor 14. Then specifically, on operation, the pressure in the pressure conduit 16 sinks below a predefined limit value, which may not normally occur in normal operation with a closed return conduit 10.

An exemplary construction of the premixing device essentially consisting of the mixing region 18 and the return valves 20 and 36, is described hereinafter by way of FIGS. 2 to 5.

Figure 2:
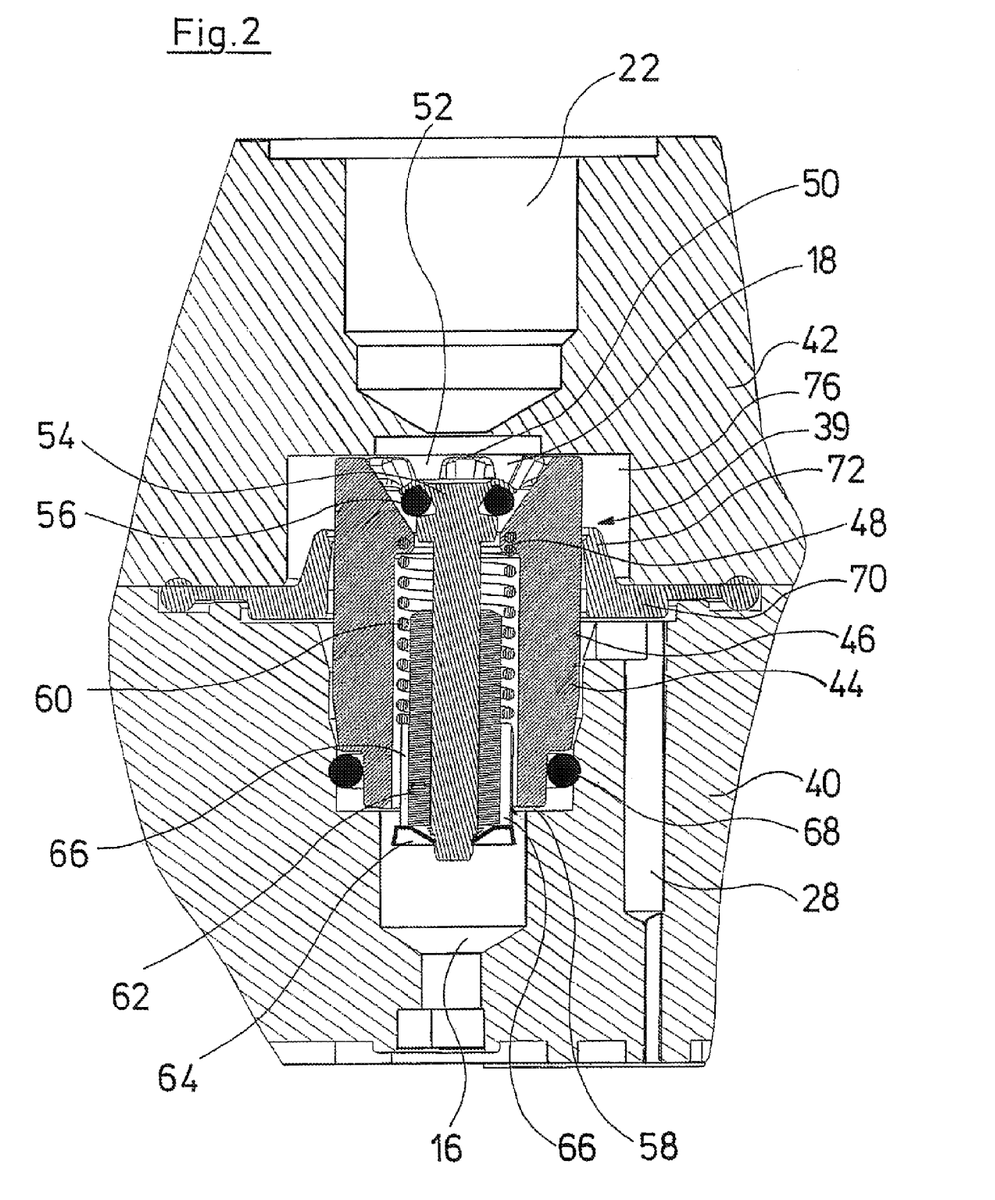
FIG. 2 is a sectioned cut-out, the premixing device of a metering pump assembly according to FIG. 1.

FIG. 2 shows a sectioned view of the premixing device 39 in a condition installed into a pump head. The pump head is formed essentially by a central plate 40 and an end-plate 42 bearing on this, wherein flow channels are designed and the premixing device 39 arranged between the plates 40 and 42.

The conduit 22 in the end plate 42 is designed as a connection, to which a fluid conduit which leads to an injection nozzle in the exhaust gas system of the vehicle may be connected. The pressure conduit 16 as well as the pressurized air conduit 28 in the form of channels in the surface and throughholes connecting thereto, are formed in the central plate 40.

The premixing device as a central component comprises a cylindrical bush 44 with a cylindrical inner wall 46. A necking 48 which divides the inner space of the bush 46 into two parts, is formed in the inside of the bush 44. The first part of the inner space, proceeding from the necking 48, widens towards a first end-side 50 of the bush 44 in a funnel-like manner. This region is the actual mixing region 18 or the mixing chamber 18 of the premixing device 39. Recesses or openings 52 which serve as entry openings for the pressurized air are formed in the peripheral wall of the mixing region 18 distributed uniformly over the periphery. The opening surrounded by the necking 48, in the inside of the bush 44, serves as an entry opening for the reduction agent into the mixing region 18. This region is closed by way of a piston 54 with an O-ring 56 inserted into a peripheral groove. Thereby, the O-ring 56, as shown in the FIGS. 3 and 4, may come to bear on the funnel-like inner wall of the mixing region 18 in the inside of the bush 44 in a sealing manner.

Figure 3:
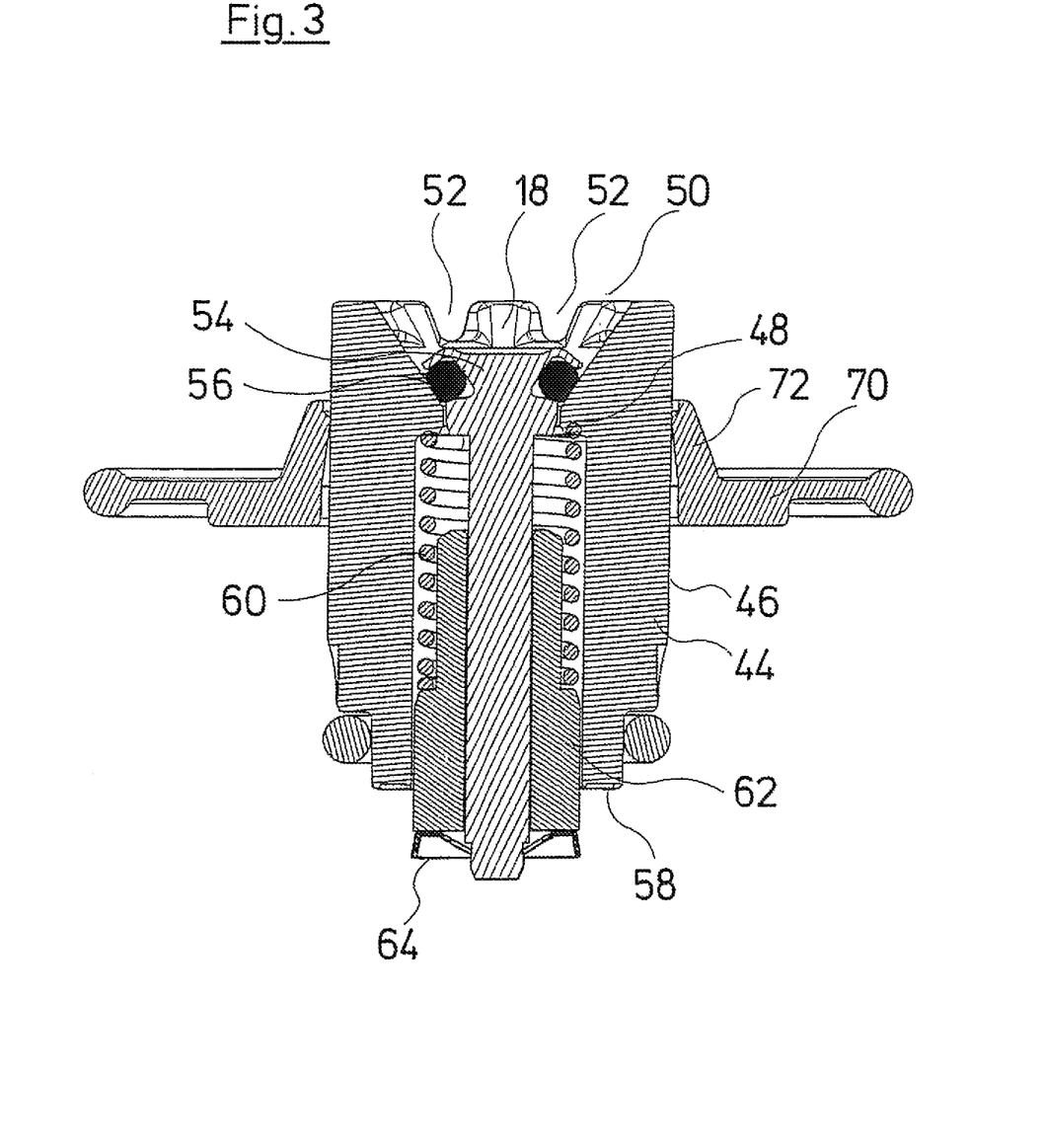
FIG. 3 is a separate sectional view, the premixing device according to FIG. 2, with closed return valves.
Figure 4:
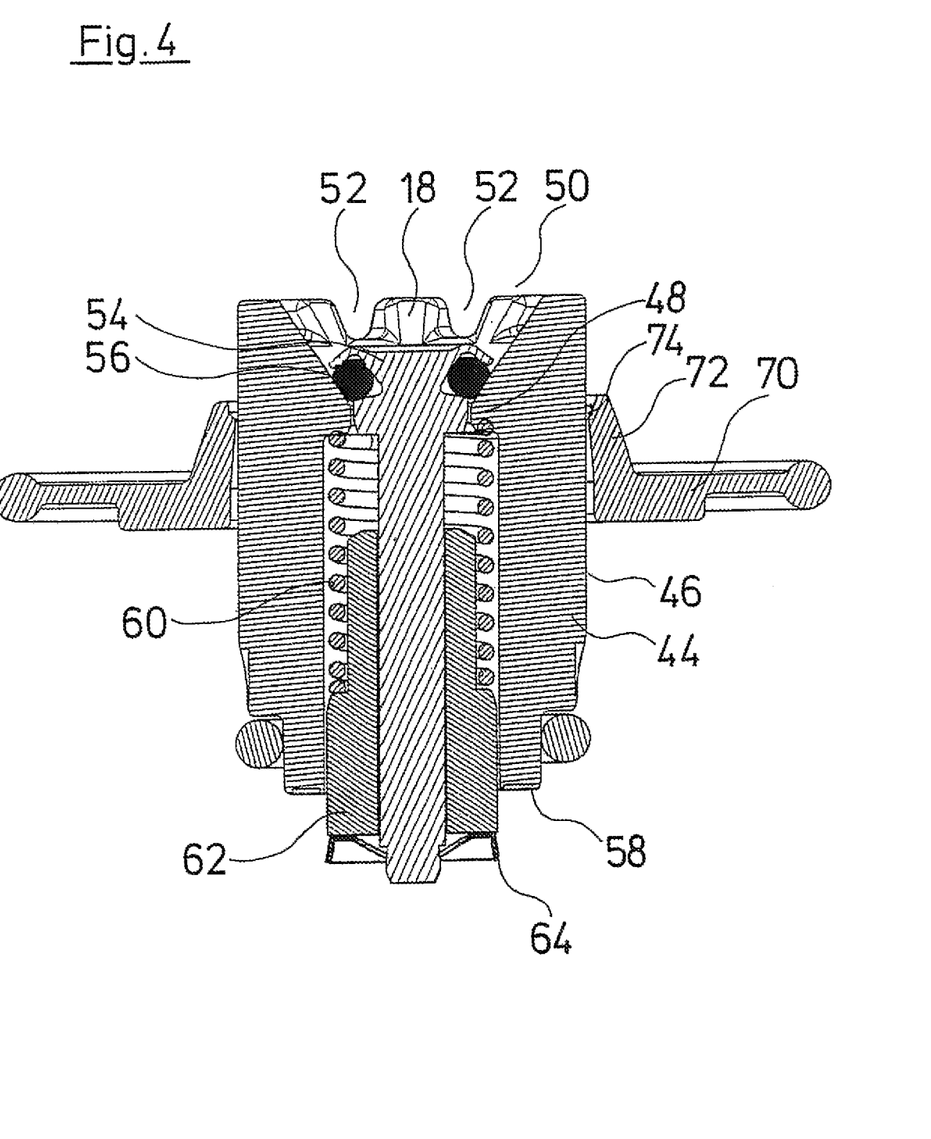
FIG. 4 is the premixing device according to FIG. 3, with an opened return valve for the supply of pressurized gas.
Figure 5:
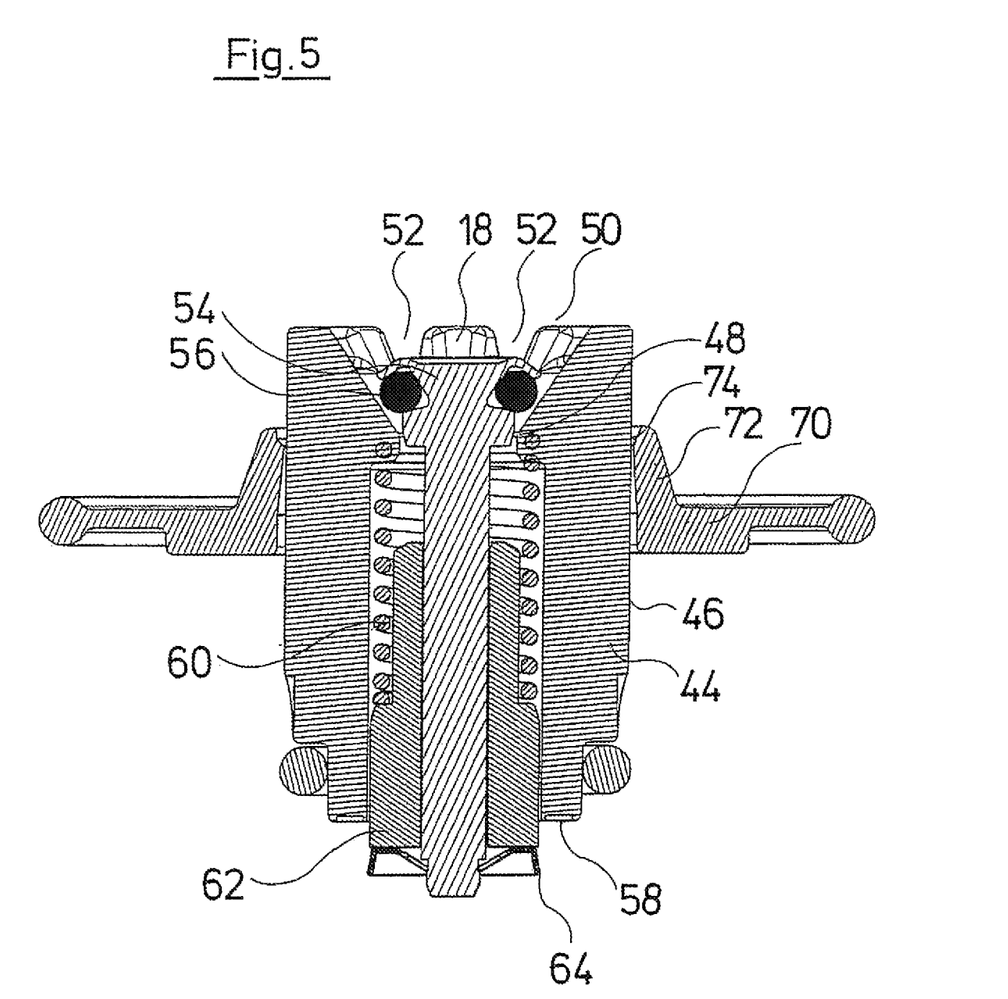
FIG. 5 is the premixing device according to FIGS. 3 and 4 with an opened return valve for the supply of reduction agent, and an opened return valve for the supply of pressurized gas.

The piston 54 extends with the piston rod 55 through the necking 48 into the second region in the inside of the bush 44 to the second end-side 58 which is distant to the first end-side 50. A compression spring which with its first end is supported on the necking 48, is arranged in the second part of the inner space of the bush 44. The opposite end of the compression spring 60 which is designed as a helical spring, on a guide bush 62 surrounding the piston rod 55, bears on a shoulder which faces the necking 48. The guide bush 62 leads the piston rod and thus the piston 54 in the inside of the bush 44, in which it bears on the inner wall of the bush 44. The guide bush 62 is supported via a spring ring 64 on the longitudinal end of the piston rod 55 which is distant to the piston 54. Thus the compression spring 60 presses the piston rod 55 in the direction of the second end-side of the bush 40, so that the piston 54 is pressed with the O-ring 56 against the funnel-like or conical inner wall of the mixing region 18. In this manner, the piston 54 which forms the return valve 20 in FIG. 1, is kept in its idle position in the closed condition, as is shown in FIGS. 3 and 4.

The guide bush on its outer periphery comprises longitudinal grooves 66 (not shown in the FIGS. 3 to 5), through which reduction agent may flow through the pressure conduit 16 into the inside of the bush 44 to the necking 48. One prevents reduction agent from flowing past the bush 44 to the outside, by way of the O-ring 58 surrounding the bush 44 at the outside. In the inserted condition, the O-ring 68 seals the outer wall of the bush 44 with respect to the inner wall of the recess, in which the bush 44 is arranged in the central plate 40.

The fluid pressure in the pressure conduit 16, in the inside of the bush 44 acts on the piston 54 in the direction of the longitudinal axis of the piston rod 55. With an adequately high fluid pressure in the pressure conduit 16, the force acting on the piston 54 by way of the pressure, exceeds the spring force of the compression spring 60, so that the piston 54 with the piston rod 55 is displaced in the direction of the first end-side 50 of the bush 44, and the piston 54 with the O-ring 56 lifts from the conical inner wall of the mixing region 18, as is shown in the FIGS. 2 and 5. Thus, an annular gap arises between the piston 54 or the O-ring 56 and the surrounding inner wall of the bush 44 or the mixing region 18 respectively, through which the reduction agent may flow into the mixing region 18.

The second return valve 36 of the premixing device 39 is formed by an annular, elastic sleeve 70 which is clamped between the central plate 40 and the end-plate 42. Thereby, in particular, a thickened region at the outer periphery of the sleeve 70 comes to bear on the central plate 40 as well as on the end-plate 42, so that the pressurized air from the pressurized air conduit 28 may not flow past the outer periphery of the collar 70.

The sleeve 70 at its outer periphery is extended in a sleeve-like manner towards the end-side 50 of the bush 44 in the axial direction, so that a collar 72 is formed. This collar 72 extends inclined in a slightly conical manner to the outer wall 46 of the bush 44, and comes to bear on this with its free end-side. Thereby, the sleeve 70 or the collar 72 are designed in an elastic manner, such that the sleeve in its idle position is sealingly held on the outer wall 46 of the bush 44, as is shown in the FIGS. 2 and 3.

If pressurized air is introduced into the pressurized air conduit 28, the pressurized air in the central plate 40, firstly on the outer periphery 46 flows around the whole bush 44, since the recess accommodating the bush 44, in the central plate 40, in the region distant to the pressure conduit 16, is larger than the outer diameter of the bush 44. The pressurized air then flows into the region between the collar 72 of the sleeve 70, and the outer wall 46 of the bush 44, wherein by way of the air pressure, the collar 72 is pressed away from the outer wall of the bush 44, so that an annular gap 74 arises between the outer wall 46 and the inner periphery of the sleeve 70 or the collar 72, through which the pressurized air may flow into the recess 76 in which the bush 44 is arranged in the end-plate 42. The pressurized air then flows from the recess 46 through the recesses or openings 52 into the mixing region 18, and from there, together with the supplied reduction agent, flows through the conduit or connection 22 further to the injection nozzle in the exhaust gas system of the vehicle.

If the supply of pressurized air in the pressurized air conduit 28 is switched off, the sleeve 70 with its collar 72 again is sealingly applied onto the outer wall 46 of the bush 44 on account of its elasticity. On account of the collar 72 of the sleeve 70 projecting into the recess 76, a higher pressure in the recess 76 succeeds in pressing the sleeve-like extension or the collar 72 of the sleeve 70 against the outer wall 46 to an even greater extent, and thus in securely closing the return valve 36.

The recesses or openings 52 are designed such that they extend in the longitudinal direction of the bush 44 up to the outer side of the piston 54. Furthermore, the recesses 52 are shaped such that they widen towards the inside of the bush 44, i.e. towards the mixing region 18. By way of this, one succeeds in pressurized air which flows through the recesses 52 into the mixing region 18, completely flowing over the whole mixing region 18 at its inner wall and in particular also the outer side of the piston 54, so that reduction agent residues may be completely flushed out of the mixing region 18.

Figure 6:
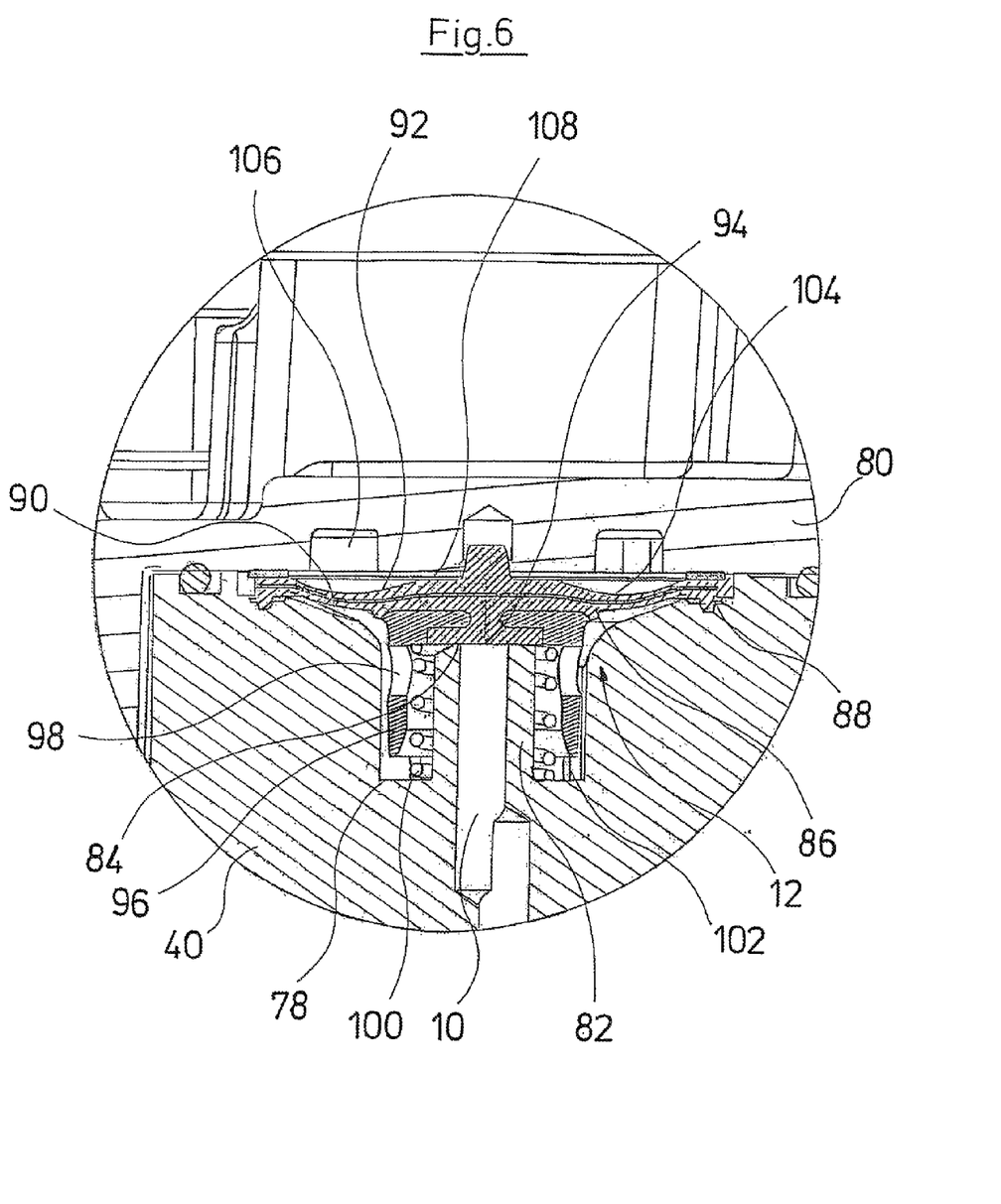
FIG. 6 is a sectioned view of the shut-off valve in the return conduit, in the closed condition.
Figure 7:
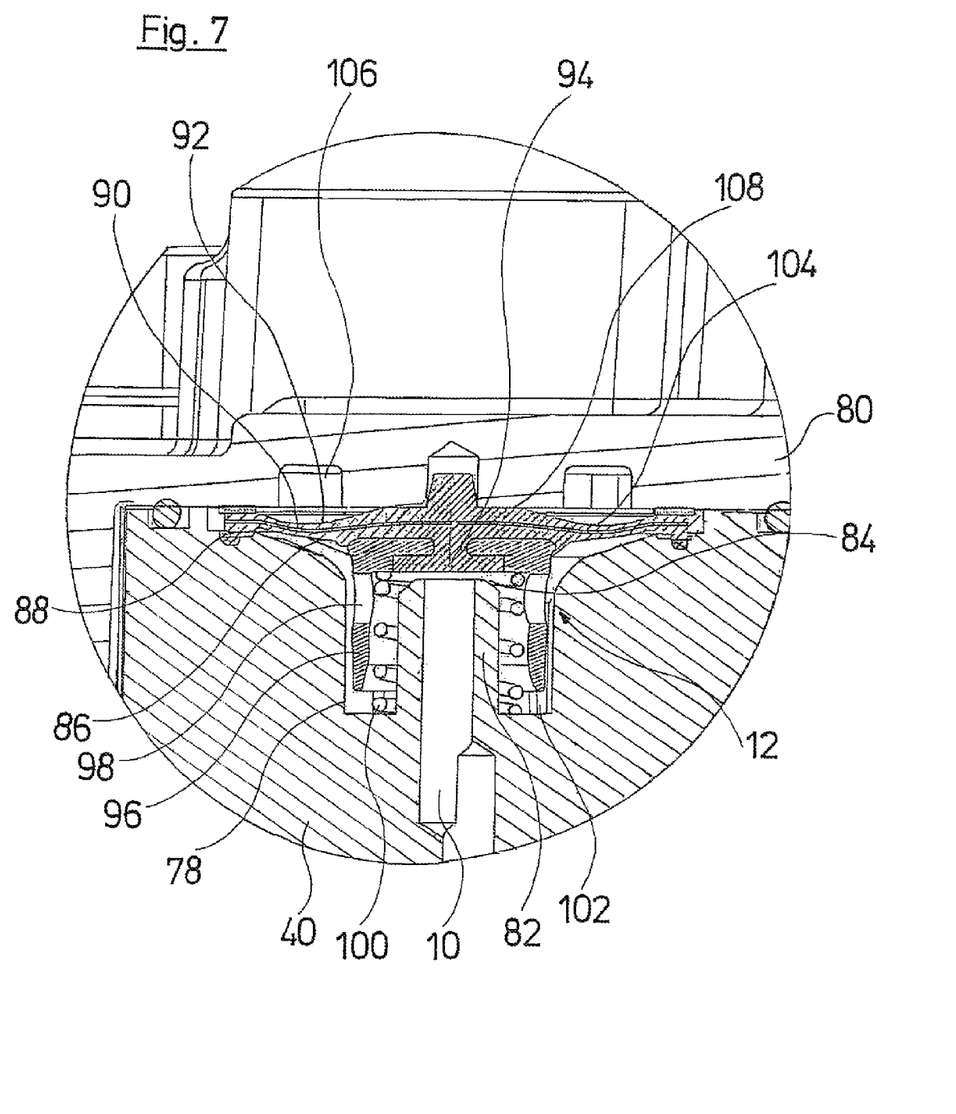
FIG. 7 is a sectioned view of the shut-off valve according to FIG. 6, in the opened condition.

The construction of the shut-off valve 12 is hereinafter described in more detail by way of the FIGS. 6 and 7. The shut-off valve 12 is arranged in the central plate 40 in a recess 78. The recess 78 is formed in the surface of the central plate 40 which is distant to the end-plate 42, and is closed by the front plate 80 of a drive housing of the metering pump assembly, to which the central plate 40 is attached in a flat manner.

The recess 78 on its base is formed in a cylindrical manner, and opens towards the front plate 80 in a funnel-like manner. An inlet connection piece 82 extends from the base of the recess 78 into the recess 78, centrally in the cylindrical section. The return conduit 10 branching from the pressure conduit 8 runs in the inside of the inlet connection piece 82, i.e. concentrically to this, such that it is open to the end-side of the inlet connection piece 82. The end-side of the inlet connection piece 82 which is distant to the base of the recess 78 thus forms a valve seat 84, on which a valve element 86 designed in a membrane-like manner sealingly bears in the closed condition, which is shown in FIG. 6. The valve element 86 is designed as a circular membrane, which at its outer periphery 88 is held between the surfaces of the central plate 40 and of the front plate 80, which are adjacent to one another. The central region of the valve membrane 86 is movable with respect to the periphery 88 in the direction of extension of the inlet connection piece 82, which is ensured by the elasticity of the membrane.

The valve membrane or the valve element 86 comprises a carrier 90 which is enclosed or peripherally injected by an elastic material 92, which also defines the sealing surface 94 coming to bear on the valve seat 84.

A guide bush 96 which comprises openings 92 in its peripheral wall, surrounding the sealing surface 94 and proceeding from the valve element 86, extends concentrically to the inlet connection piece 92. The guide bush 96 is integrally connected to the elastic material 92, and via this, to the carrier 90 of the valve element 86. Preferably, the carrier 90 and the guide bush 96 are peripherally injected with the elastic material 92 and thus connected to one another with a positive fit.

A compression spring 100 in the form of a helical spring is arranged or guided in the inside of the guide bush 96, so that the compression spring 100 extends parallel to the longitudinal axis of the inlet connection piece 82 between its outer periphery and the inner periphery of the guide bush 96. The compression spring 100 with a longitudinal end is supported on the base of the recess 78, and with the opposite longitudinal end is supported on the valve element 86 at the periphery of the sealing surface 94. The compression spring 100 is dimensioned such that it presses the valve element 96 into its opened position, i.e. its position distanced to the valve seat 84, which is shown in FIG. 7. In this position of the shut-off valve 12 shown in FIG. 7, the reduction agent which is delivered by the metering pump into the return conduit 10, may flow through the inlet connection piece 82 and through the annular gap between the sealing surface 94 and the valve seat 84, into the inside of the guide bush 96. The reduction agent may flow through the opened end-side distant to the valve element 86, as well as the openings 98 of the guide bush 96, into the recess 78. The reduction agent from the recess 78, flows through a channel 102 opening at the periphery of the recess 78, to a connection piece of the metering pump assembly, and from there further through the return conduit to the reduction agent tank 4.

In order to close the shut-off valve 12, the membrane-like valve element 86 is impinged with the pressurized air from the pressurized air conduit 28, from its side distant to the inlet connection piece 82, via the actuation conduit 38. The air pressure acting on the surface 104 of the valve element 86 moves the valve element 86 against the spring force of the compression spring 100 in the direction of the longitudinal axis of the inlet connection piece 82 to this, so that the valve element 86 with its sealing surface 84 comes to bear on the valve seat 84 in a sealing manner. In this condition shown in FIG. 6, no reduction agent may flow out of the inlet connection piece 82 into the inside of the recess 78, so that the return conduit 10 is closed or interrupted by the shut-off valve 12.

The actuation conduit 38 through which the pressurized air flows for impinging the surface 104, is designed as a channel in the inside of the central plate 40, which opens out between the central plate 40 and the front plate 80, in the region of the surface 104 of the valve element 86. For this, in the shown example, an open annular channel 106 which faces the valve element 86 and in which the pressurized air may distribute, is formed in the front plate 80, so that the pressurized air acts uniformly on the whole surface 104. Furthermore, the surface 104 is designed in a curved manner, such that in an annular region bordering the peripheral region 88 in a radially innerlying manner, it is formed distanced to the plane of the surface of the central plate 40.

The opposite central region 108 on the surface 104 of the sealing surface 94, is designed as an abutment surface, which in the opened condition (see FIG. 7) of the shut-off valve 12 comes to bear on the surface of the front plate 80, and thus limits the path of the valve element 86 in the opened position. The central region 108 centrically comprises a projection, which for guiding the valve element, engages into a hole in the surface of the front plate 80.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A metering pump assembly for admixing into an exhaust gas flow a required demand for a fluid reduction agent, comprising:
    a metering pump which on an entry side is connected to a connection for connecting to a reduction agent tank, and at an exit side is connected to a pressure conduit as well as a return conduit to the reduction agent tank, the metering pump comprising an associated drive, by way of a control of the drive a quantity of the reducing agent delivered by the metering pump is set exactly to the required demand,
    a return valve biased against the fluid pressure produced by the metering pump, is arranged in the pressure conduit, the return conduit is connected to the pressure conduit in front of the return valve in the flow direction of the reduction agent, wherein a biasing force which keeps the return valve closed, is larger than a force acting on the return valve by way of a fluid pressure of an opened return conduit, and with a closed return conduit, the force acting on the return valve by way of the fluid pressure exceeds the biasing force of the return valve,
    a first shut-off valve for the selective closing of the return conduit, is arranged in the return conduit,
    a premixing device arranged downstream of the metering pump that mixes the reduction agent delivered by the metering pump with a pressurized gas, and
    a second shut-off valve to selectively interrupt the supply of pressurized gas to the premixing device is arranged on an entry side of the premixing device in a pressurized gas conduit leading to the premixing device, the second shut-off valve in the pressurized gas conduit is coupled to the first shut-off valve in the return conduit to close the return conduit when the pressurized gas conduit is open,
    wherein the first shut-off valve may be actuated by pressurized gas, and the pressurized gas conduit leading to the premixing device is connected behind the second shut-off valve in the flow direction to an actuation connection of the first shut-off valve,
    wherein the metering pump assembly is adapted to perform a starting operation during which the reduction agent is delivered by the metering pump through the return conduit back into the tank until the metering pump and the pressure conduit are completely filled with reduction agent and after complete filling, the return conduit is closed by the first shut-off valve, so that the reduction agent may no longer flow back into the reduction agent tank, and
    wherein the first shut-off valve is completely closed preventing the reduction agent delivered by the metering pump from returning to the reduction agent tank at all times when each of (i) the pressurized gas supply is connected to the entry end of the pressurized gas conduit, and (ii) the pressurized gas pressurizes the pressurized gas conduit and (iii) the reduction agent is being delivered to the premixing device simultaneously occur.

2. A metering pump assembly according to claim 1, characterized in that the return valve is arranged directly on a mixing chamber of a premixing device, in which the reduction agent delivered by the metering pump is mixed with a pressurized gas.

3. A metering pump assembly according to claim 1, characterized in that a pressure sensor detecting the fluid pressure is arranged in the pressure conduit or the return conduit, in front of the return valve and the first shut-off valve in the flow direction.

4. A metering pump assembly according to claim 3, characterized in that the first shut-off valve is coupled to the pressure sensor in a manner such that on reaching a predefined fluid pressure detected by the pressure sensor, the first shut-off valve is switched over into its position closing the return conduit.

5. A metering pump assembly according to claim 1, characterized in that the first shut-off valve is biased in a manner such that in its idle position, it is held in its position opening the return conduit.

6. A metering pump assembly according to claim 1, characterized in that the pressurized gas conduit leading to the premixing device is connected to the actuation connection of the first shut-off valve, in front of a throttle location in the flow direction.

7. A metering pump assembly according to claim 1, characterized in that the second shut-off valve is coupled to a pressure sensor arranged in front of the return valve and the first shut-off valve in the flow direction, in the pressure conduit or the return conduit, in a manner such that the second shut-off valve is switched over into its position opening the pressurized gas conduit on reaching a predefined fluid pressure detected by the pressure sensor.

8. A metering pump assembly according to claim 1, characterized in that the second shut-off valve in the pressurized gas conduit is biased in a manner such that in the idle position, it is held in its position interrupting the pressurized gas conduit.

9. A metering pump assembly according to claim 1, characterized in that a return valve is arranged in the premixing device on an exit side of the pressurized gas supply.

10. A metering pump assembly for admixing into an exhaust gas flow a required demand for a fluid reduction agent mixable with a pressurized gas from a pressurized gas supply, comprising:
    a metering pump connected on an entry side to a reduction agent tank, and on an exit side to a pressure conduit;
    a return conduit connecting the pressure conduit to the reduction agent tank;
    a first shut-off valve in the return conduit, the first shut-off valve actuated by the pressurized gas;
    a return valve in the pressure conduit downstream from the return conduit, the return valve biased against a fluid pressure produced by the reduction agent delivered by the metering pump by a force which keeps the return valve closed when the first shut-off valve is open and which is exceeded when the first shut-off valve is closed;
    a premixing device connected to an exit end of the pressure conduit downstream from the return valve;
    a pressurized gas conduit connected to an entry side of the premixing device, the pressurized gas conduit having an entry end connectable to the pressurized gas supply;
    a second shut-off valve in the pressurized gas conduit between the premixing device and the entry end of the pressurized gas conduit; and an actuation conduit having a first end connected to the pressurized gas conduit downstream from the second shut-off valve and a second end connected to an actuation connection of the first shut-off valve, wherein the first shut-off valve is completely closed preventing the reduction agent delivered by the metering pump from returning to the reduction agent tank at all times when each of (i) the pressurized gas supply is connected to the entry end of the pressurized gas conduit and (ii) the pressurized gas pressurizes the pressurized gas conduit and (iii) the reduction agent is being delivered to the premixing device simultaneously occur.

11. The metering pump assembly according to claim 10, wherein the metering pump assembly is adapted to perform a starting operation during which the reduction agent is delivered by the metering pump through the return conduit back into the reduction agent tank until the metering pump and the pressure conduit are completely filled with reduction agent and after complete filling, the return conduit is closed by the first shut-off valve, so that the reduction agent may no longer flow back into the reduction agent tank.

\* \* \* \* \*